United States Patent Office 3,351,639
Patented Nov. 7, 1967

---

3,351,639
17-ALKYL-20-KETO SUBSTITUTED PREGNENES, PREGNADIENES AND METHODS OF PREPARING THE SAME
George Rodger Allen, Jr., Old Tappan, and Martin Joseph Weiss, Oradell, N.J., assignors to American Cyanamid Company, Stamford, Conn., a corporation of Maine
No Drawing. Filed Mar. 20, 1963, Ser. No. 266,491
2 Claims. (Cl. 260—397.3)

This invention relates to new organic compounds. More particularly, it relates to 17-alkylated pregnenes, pregnadienes and methods of preparing the same.

The new steroids of the present invention may be illustrated by the following formula:

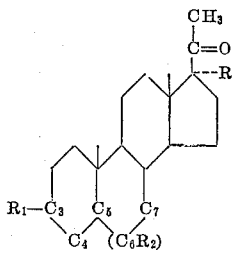

wherein R is an alkyl radical; $R_1$ is selected from the group consisting of hydrogen, hydroxyl, halogen and alkanoyloxy radicals; $R_2$ is selected from the group consisting of hydrogen, lower alkyl and chlorine; and:

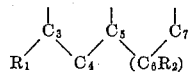

is a radical selected from the group consisting of:

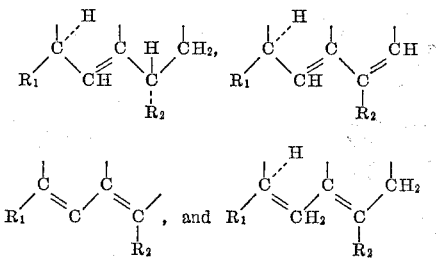

and when

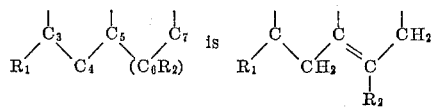

then $R_1$ is selected from the group consisting of hydrogen and halogen and when:

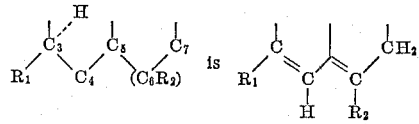

then $R_1$ is hydrogen.

Also included within the purview of the present invention are 17α-alkyl-3-alkoxy-6-hydrogen or lower alkyl-pregna-5-en-20-ones which are described in the examples hereinafter.

The present compounds are, in general, white crystalline solids. They are substantially insoluble in water and somewhat soluble in the usual organic solvents such as benzene, petroleum ether and the like.

A number of compounds of this invention can be prepared by treatment of the corresponding $\Delta^5$-3β-ols (I) with appropriate reagents. Thus, treatment with β-chloro-α,α,β-trifluoroethyldiethylamine produces the 3β-fluoro-derivatives (II), treatment with thionyl chloride gives the 3β-chloro derivatives (III), and treatment with potassium t-butoxide and an alkyl halide furnishes the 3β-alkoxy derivatives (IV). The 3-unsubstituted methylene derivatives can be obtained by treatment of the corresponding $\Delta^5$-3β-chloro (V) derivative with sodium and an alcohol such as amyl alcohol, a procedure which also usually reduces the 20-keto group to a 20-ol. The desired 20-ketone (VI) is then obtained by oxidation of the 20-ol. The $\Delta^4$ derivatives can be prepared by reduction of the corresponding $\Delta^4$-3-ketone (VII), preferably with a metal hydride to the $\Delta^4$-3β-ol (VIII), which with acetic acid undergoes dehydration with the formation of the $\Delta^{3,5}$-diene (IX). When lithium aluminum hydride is utilized as the reducing agent, the 20-keto group also undergoes reduction and it is necessary to oxidize, after formation of the 3,5-diene, to a 20-ketone (XI). With metal hydrides, such as sodium borohydride, in the presence of an alcoholic solvent, such as methanol, as the reducing agent preferential reduction of the 3-ketone can be achieved and an oxidation step is not necessary. Thus, use of the latter reagent also affords the $\Delta^4$-3β-ol-20-ketones (X). Similar treatment of a $\Delta^{4,6}$-3-ketone will produce the $\Delta^{4,6}$-3β-ol (XIII). This novel method for the preferential reduction of a 3-carbonyl group in a 17-alkylpregn-4-ene (or 4,6-diene)-3,20-dione to give the corresponding $\Delta^4$- or $\Delta^{4,6}$-3β-ol is to be considered part of this invention. Reaction of the $\Delta^4$-3β-ols or the $\Delta^{4,6}$-3β-ols with alkanoylating agents will furnish the corresponding 3β-alkanoyloxy derivatives. These reactions are illustrated by the following equations, and more specifically, by the examples which follow.

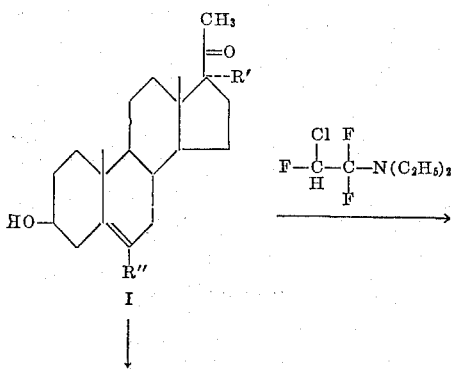

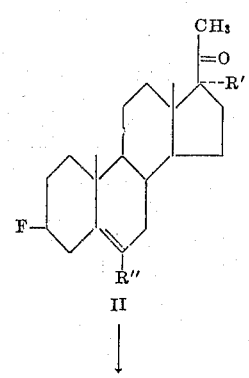

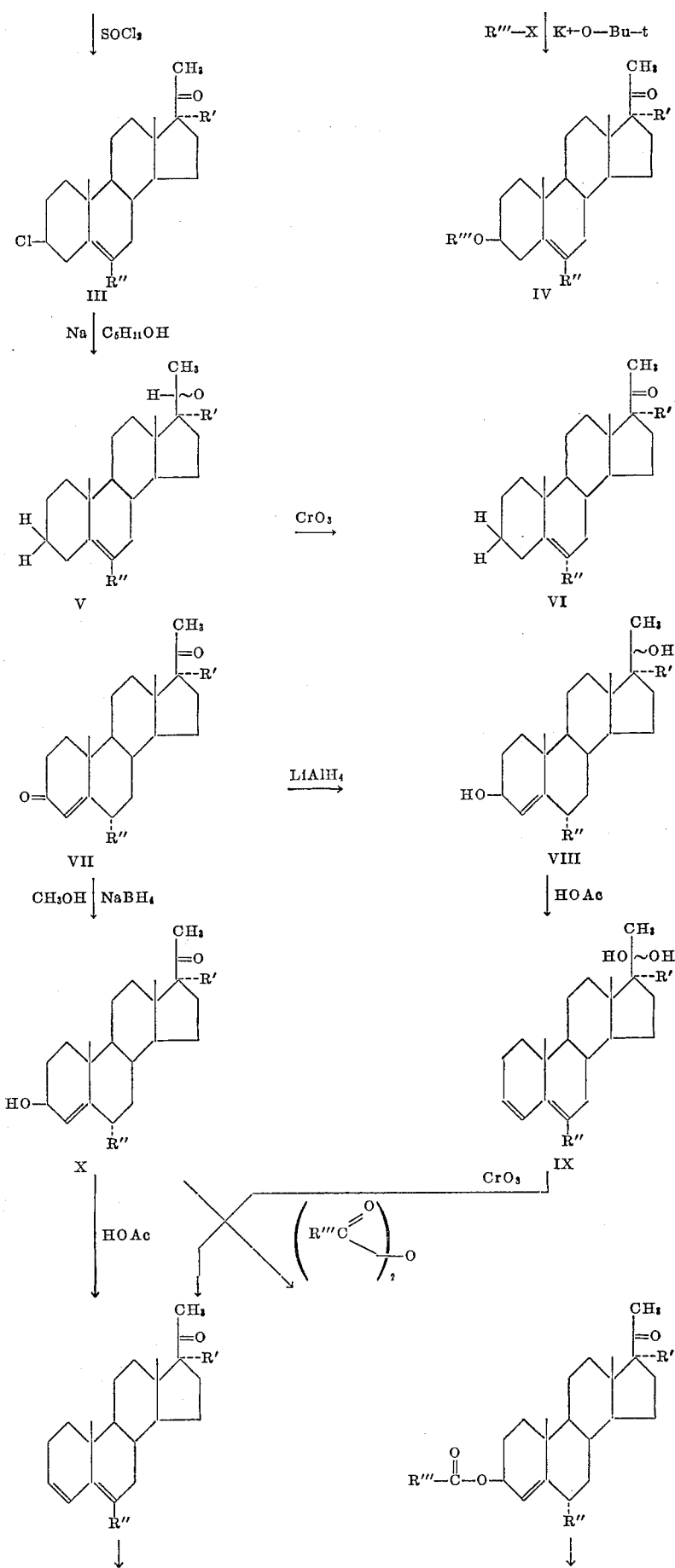

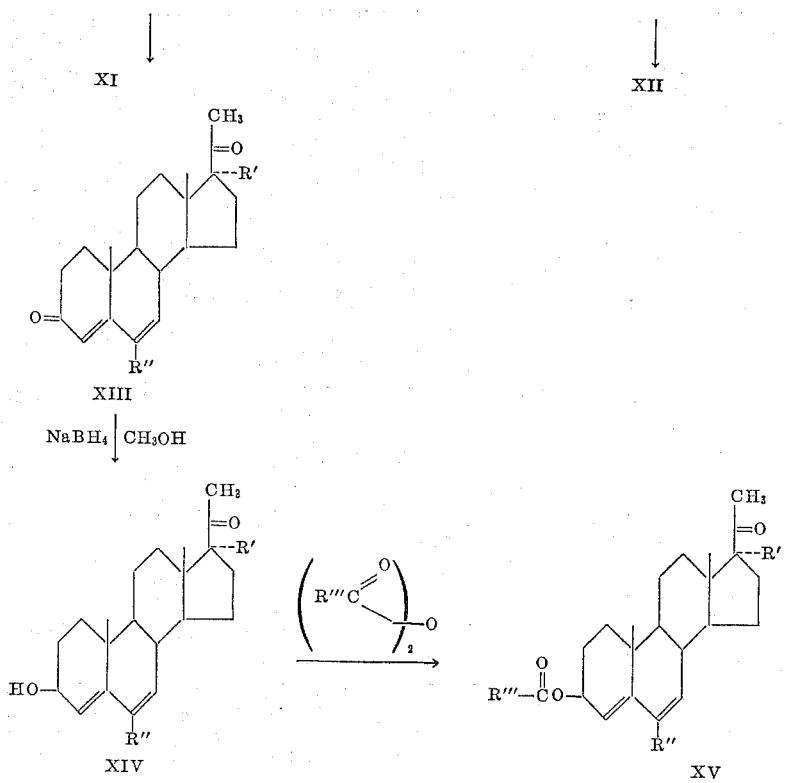

The compounds of the present invention possess progestational activity and are useful in place of known progestational steriods, such as progesterone, in the treatment, for example, of habitual abortion. These compounds have an additional utility in that they are effective when administered by the oral route. Furthermore, these compounds are also useful by oral administration for the inhibition of conception.

The following examples illustrate in detail the preparation of the compounds of the present invention.

*Example 1.—Preparation of 17α-ethyl-3β-fluoropregn-5-en-20-one (II)*

A solution of 340 mg. (1 mmole) of 17α-ethylpregnenolone [Tetrahedron Letters, [11], 489 (1962)] and 200 mg. (1.06 mmoles) of β-chloro-α,α,β-trifluoroethyl diethylamine in 10 ml. of methylene chloride is allowed to stand in the refrigerator 17.5 hours. The solution is diluted with methylene chloride, washed with sodium carbonate solution and water, dried over magnesium sulfate and evaporated. Crystallization of the residue from methanol gives white crystals, melting point 178–180° C.; $[\alpha]_D^{25}$ —64° (c. 0.69, chloroform);

$$\lambda_{max.}^{KBr} \ 5.91\mu$$

*Example 2.—Preparation of 3β-fluoro-17α-methylpregn-5-en-20-one (II)*

Treatment of 146 mg. (0.44 mmole) of 17α-methylpregnenolone [Helv. Chim. Acta, 32, 270 (1949)] with 94 mg. (0.5 mmole) of β-chloro-α,α,β-trifluoroethyldiethylamine in 10 ml. of methylene chloride as described in Example 1 gives, after recrystallization from dilute methanol, white crystals, melting point 129–131° C.; $[a]_D^{25}$ —57.5° (c. 1.1, chloroform);

$$\lambda_{max.}^{KBr} \ 5.89\mu$$

*Example 3.—Preparation of 17α-ethyl-3β-fluoro-6-methylpregn-5-en-20-one (II)*

In the manner described in Example 1, 500 mg. of 17α-ethyl-6-methylpregnenolone [Chemistry and Industry, 118 (1963)] is treated with 300 mg. of β-chloro-α,α,β-trifluoroethyldiethylamine. The product is chromatographed on silica gel, and the solids eluted by benzene are recrystallized from dilute methanol to give white crystals, melting point 125–127° C.; $[\alpha]_D^{25}$ —73° (c. 1.1, chloroform);

$$\lambda_{max.}^{KBr} \ 5.90\mu$$

*Example 4.—Preparation of 3-acetoxy-17α-octylpregna-3,5-dien-20-one*

A solution of 2.00 g. of 17α-octylprogesterone [Chemistry and Industry, 118 (1963)] in 30 ml. of acetic anhydride and 30 ml. of acetyl chloride is heated on the steam bath for 2 hours. The resulting solution is chilled in ice and poured with stirring onto cracked ice. After the excess reagents hydrolyze, the mixture is extracted with methylene chloride. The extract is washed repeatedly with water, dried over magnesium sulfate and the solvent removed. The residue has $$\lambda_{max.}^{MeOH} \ 235 \ m\mu \ (\epsilon\ 18,000)$$

and $$\lambda_{max.}^{KBr} \ 5.75, \ 5.91, \ 6.00, \ 6.10, \ 8.20-8.30\mu$$

*Example 5.—Preparation of 17α-octylpregnenolone (I)*

A solution of 2.00 g. of 3-acetoxy-17α-octylpregna-3,5-dien-20-one (Example 4) and 2.00 g. of sodium borohydride in 125 ml. of methanol and 60 ml. of tetrahydrofuran containing 5 ml. of water is kept at room temperature for 18 hours. The solution is diluted with water and extracted with methylene chloride. The organic solution is dried over magnesium sulfate, and the solvent is evaporated to give material which has no appreciable ultraviolet absorption at 20 γ/ml. and has $$\lambda_{max.}^{KBr} \ 2.95, \ 5.91\mu$$

*Example 6.—Preparation of 3β-fluoro-17α-octylpregn-5-en-20-one (II)*

Treatment of 17α-octylpregnenolone (Example 5) with β-chloro-α,α,β-trifluoroethyl diethylamine in the manner of Example 1 produces 3β-fluoro-17α-octylpregn-5-en-20-one.

*Example 7.—Preparation of 3β-chloro-17α-ethylpregn-5-en-20-one (III)*

A solution of 337 mg. of 17α-ethylpregnenolone in 3.5 ml. of thionyl chloride is allowed to stand at room temperature for 21.5 hours. The solution is poured onto cracked ice and after the excess thionyl chloride hydrolyzes, the mixture is distributed between methylene chloride and additional water. The organic solution is washed successively with saline, dilute sodium carbonate solution and finally saline, dried over magnesium sulfate and evaporated. The residue is recrystallized from acetone-hexane to give white needles, melting point 151–153° C.; $[\alpha]_D^{25}$ —46° (c. 1.6, chloroform);

$$\lambda_{max.}^{KBr}\ 5.90\mu$$

*Example 8.—Preparation of 3β-chloro-17α-octylpregn-5-en-20-one (III)*

When 17α-octylpregnenolone (Example 5) is reacted with thionyl chloride in the manner of Example 7, the product 3β-chloro-17α-octylpregn-5-en-20-one is obtained.

*Example 9.—Preparation of 17α-ethyl-3β-methoxy-6-methylpregn-5-en-20-one (IV)*

To a solution obtained by the interaction of 59 mg. of potassium with 20 ml. of t-butyl alcohol is added 358 mg. of 17α-ethyl-6-methylpregnenolone, 15 ml. of t-butyl alcohol being used to aid in the transfer. The solution is heated at reflux temperature with mechanical stirring and a solution of 5 ml. of methyl iodide in 20 ml. of t-butyl alcohol is added dropwise over 2 hours. Heating and stirring are continued for an additional 2 hours. The cooled mixture is distributed between water and methylene chloride. The organic solution is washed with saline, dried over magnesium sulfate and evaporated. The residue is chromatographed on silica gel. The material eluted by the first 125 ml. of a benzene-ether (99:1) solution is recrystallized from dilute methanol to give white needles, melting point 162–164° C.;

$$\lambda_{max.}^{KBr}\ 5.91,\ 9.10\mu$$

*Example 10.—Preparation of 17α-ethyl-3β-octyloxypregn-5-en-20-one (IV)*

Treatment of 17α-ethylpregnenolone with potassium t-butoxide and octyl iodide as described in Example 9 produces 17α-ethyl-3β-octyloxypregn-5-en-20-one.

*Example 11.—Preparation of 3β-ethoxy-17α-octylpregn-5-en-20-one (IV)*

When 17α-octylpregnenolone is reacted with potassium t-butoxide and ethyl iodide in the manner of Example 9 the product 3β-ethoxy-17α-octylpregn-5-en-20-one is obtained.

*Example 12.—Preparation of 17α-ethyl-3β,20ξ-dihydroxypregn-4-ene (VIII)*

A mixture of 692 mg. of 17α-ethylprogesterone [Chemistry and Industry, 118 (1963)] and 130 mg. of lithium aluminum hydride in 30 ml. of ether is heated at reflux temperature for 30 minutes with magnetic stirring. Ethyl acetate is added slowly, followed by water. The organic solution is dried over magnesium sulfate and evaporated to give a solid which has no appreciable ultraviolet absorption and no absorption in the carbonyl region of its infrared spectrum.

*Example 13.—Preparation of 17α-ethyl-3β-hydroxypregn-4-en-20-one (X)*

A solution of 500 mg. of 17α-ethylprogesterone and 500 mg. of sodium borohydride in 25 ml. of methanol, 15 ml. of tetrahydrofuran and 1 ml. of water is kept at room temperature for 21 hours. The solution is distributed between water and methylene chloride. The organic solution is dried over magnesium sulfate and evaporated to give a solid residue which is absorbed onto silica gel. The solid contained in the benzene-ether (95:5) eluates is recrystallized from acetone-hexane to furnish white plates, melting point 179–181° C.; $[\alpha]_D$ +43° (c. 1.48, chloroform); no appreciable ultraviolet absorption at 20γ/ml.;

$$\lambda_{max.}^{KBr}\ 2.87,\ 5.93,\ 6.03,\ 9.50,\ 9.60\mu$$

*Example 14.—Preparation of 3β-hydroxy-17α-octylpregn-4-en-20-one (X)*

Treatment of 17α-octylprogesterone with sodium borohydride in the manner of Example 13 gives the product 3β-hydroxy-17α-octylpregn-4-en-20-one.

*Example 15.—Preparation of 17α-ethyl-20ξ-hydroxypregna-3,5-diene (IX)*

A solution of 17α-ethyl-3β,20ξ-dihydroxypregn-4-ene, the product of Example 12, in 50 ml. of 50% acetic acid is heated at reflux temperature for one hour. The cooled solution is distributed between water and methylene chloride; the organic solution is washed several times with water, dried over magnesium sulfate and evaporated. The residue has $$\lambda_{max.}^{MeOH}\ 228,\ 234,\ 242\ m\mu\ \text{and}\ \lambda_{max.}^{KBr}\ 3.0\mu$$

*Example 16.—Preparation of 17α-ethylpregna-3,5-dien-20-one (XI)*

To an ice-chilled slurry of 700 mg. of chromium trioxide in 10 ml. of pyridine is added a solution of 17α-ethyl-20ξ-hydroxypregna-3,5-diene (Example 15) in 15 ml. of pyridine. The mixture is then magnetically stirred for 30 minutes and then kept at room temperature for 22 hours. The mixture is poured into water and extracted with methylene chloride. Filtration is necessary to remove some undissolved solid. The organic solution is dried over magnesium sulfate and evaporated. The residue is extracted with hot benzene and the extract is adsorbed onto silica gel. The column is washed with benzene and the solid remaining on evaporation of the solvent is recrystallized from dilute methanol to give white crystals, melting point 155–157° C.;

$$\lambda_{max.}^{MeOH}\ 228,\ 234,\ 248\ m\mu\ \text{and}\ \lambda_{max.}^{KBr}\ 5.92,\ 6.08\mu$$

*Example 17.—Preparation of 17α-ethylpregna-3,5-dien-20-one (XI)*

A solution of 17α-ethyl-3β-hydroxypregn-4-en-20-one (Example 13) in 100 ml. of 50% acetic acid is heated at reflux temperature for 45 minutes. After 10 minutes a solid separates from the solution. The mixture is chilled and filtered to give 360 mg. of white crystals, melting point 155–158° C. This material is recrystallized from methanol to give white needles, melting point 155–157° C. The identity of this material with that of Example 16 is shown by melting point and infrared and ultraviolet spectral comparisons.

*Example 18.—Preparation of 17α-octylpregna-3,5-dien-20-one (XI)*

Treatment of 3β-hydroxy-17α-octylpregn-4-en-20-one (Example 14) with acetic acid as described in Example 17 produces 17α-octylpregna-3,5-dien-20-one.

*Example 19.— Preparation of 3β-acetoxy-17α-ethylpregn-4-en-20-one (XII)*

A solution of 200 mg. of 17α-ethyl-3β-hydroxypregn-4-en-20-one (Example 13) and 1 ml. of acetic anhydride in 10 ml. of pyridine is kept at room temperature for 18 hours. The solution is diluted with water and the precipitated crystals are extracted into methylene chloride. The extract is washed several times with water, dried over magnesium sulfate and evaporated. The residue is dissolved in toluene and the solvent is again evaporated. The residue crystallizes from acetone-hexane to give white crystals, melting point 161–163° C.; $[\alpha]_D^{25}$ —1.96° (c.

0.5, chloroform); no appreciable ultraviolet absorption at 20γ/ml.;

$$\lambda_{max.}^{KBr} 5.75, 5.88, 6.00, 8.05, 9.85\mu$$

Example 20.—Preparation of 17α-ethyl-3β-octanoyloxy-pregn-4-en-20-one (XII)

Treatment of 17α-ethyl-3β-hydroxypregn-4-en-20-one (Example 13) with caprylic anhydride in pyridine solution in the manner of Example 19 gives 17α-ethyl-3β-octanoyloxypregn-4-en-20-one.

Example 21.—Preparation of 3β-acetoxy-17α-octylpregn-4-en-20-one (XII)

Treatment of 3β-hydroxy-17α-octylpregn-4-en-20-one (Example 14) with acetic anhydride by the procedure of Example 19 gives 3β-acetoxy-17α-octylpregn-4-en-20-one.

Example 22.—Preparation of 17α-ethyl-3β-hydroxy-6α-methylpregn-4-en-20-one (X)

When 17α-ethyl-6α-methylprogesterone [Chemistry and Industry, 118 (1963)] is reacted with sodium borohydride by the procedure described in Example 13 the product 17α-ethyl-3β-hydroxy-6α-methylpregn-4-en-20-one is obtained.

Example 23.—Preparation of 3β-acetoxy-17α-ethyl-6α-methylpregn-4-en-20-one (XII)

Treatment of 17α-ethyl-3β-hydroxy-6α-methylpregn-4-en-20-one (Example 22) with acetic anhydride in the manner of Example 19 is productive of 3β-acetoxy-17α-ethyl-6α-methylpregn-4-en-20-one.

Example 24.—Preparation of 17α-ethyl-6-methylpregna-3,5-dien-20-one (XI)

When 17α-ethyl-3β-hydroxy-6α-methylpregn-4-en-20-one (Example 22) is treated with acetic acid in water according to the procedure described in Example 17, the product is 17α-ethyl-6-methylpregna-3,5-dien-20-one.

Example 25.—Preparation of 17α-ethyl-3β-hydroxypregna-4,6-dien-20-one (XIV)

A solution of 400 mg. of 17α-ethylpregna-4,6-diene-3,20-dione [Chemistry and Industry, 118 (1963)] in 150 ml. of methanol, 10 ml. of tetrahydrofuran and 2 ml. of water is treated with 400 mg. of sodium borohydride and kept at room temperature for 15 hours. Most of the solvent is removed and the concentrate is distributed between water and methylene chloride. The organic phase is dried over magnesium sulfate and evaporated. The residue is recrystallized from methanol to give white needles, melting point 198–205° C.;

$$\lambda_{max.}^{MeOH} 232, 238, 247 \text{ m}\mu, \lambda_{max.}^{KBr} 2.80, 5.95, 6.10, 6.20\mu$$

Example 26.—Preparation of 3β-acetoxy-17α-ethyl-pregna-4,6-dien-20-one (XV)

Treatment of 60 mg. of 17α-ethyl-3β-hydroxypregna-4,6-dien-20-one (Example 25) with 1 ml. of acetic anhydride in 10 ml. of pyridine in the manner described in Example 19 produces white crystals. This solid is recrystallized from dilute methanol to give white crystals, melting point 176–178° C.;

$$\lambda_{max.}^{MeOH} 232, 237, 247 \text{ m}\mu; \lambda_{max.}^{KBr} 5.75, 5.92, 6.10, 6.20, 8.10\mu$$

Example 27.—Preparation of 17α-ethyl-6-methylpregna-4,6-dien-3,20-dione (XIII)

A solution of 500 mg. of 17α-ethyl-6α-methylprogesterone [Chemistry and Industry, 118 (1963)] in 15 ml. of dioxane is saturated with hydrogen chloride with magnetic stirring. The solution is chilled in an ice bath and treated with 340 mg. of dichlorodicyano-p-benzoquinone. This material dissolves and within seconds a solid separates. The mixture is stirred at room temperature for 60 minutes and filtered. The residue is washed with cold dioxane and the combined filtrate and washings are diluted with water and extracted with methylene chloride. The extracts are washed successively with water, 1% sodium hydroxide solution and finally with saline. Removal of the solvent gives a residue which crystallizes from acetone-hexane to give white needles, melting point 182–183° C.; $[\alpha]_D^{25}$ +51° (c. 0.97, chloroform);

$$\lambda_{max.}^{MeOH} 290 \text{ m}\mu \ (\epsilon 23,600); \lambda_{max.}^{KBr} 5.91, 6.00, 6.15, 6.30\mu$$

Example 28.—Preparation of 17α-ethyl-3β-hydroxy-6-methylpregna-4,6-dien-20-one (XIV)

Treatment of 17α-ethyl-6-methylpregna-4,6-diene-3,20-dione (Example 27) with sodium borohydride in the manner of Example 25 is productive of 17α-ethyl-3β-hydroxy-6-methylpregna-4,6-dien-20-one.

Example 29.—Preparation of 17α-ethyl-6-methyl-3β-octanoyloxypregna-4,6-dien-20-one (XV)

Treatment of 17α-ethyl-3β-hydroxy-6-methyl-pregna-4,6-dien-20-one with caprylic anhydride in pyridine solution in the manner described in Example 19 gives 17α-ethyl-6-methyl-3β-octanoyloxypregna-4,6-dien-20-one.

Example 30.—Preparation of 17α-octylpregna-4,6-diene-3,20-dione (XIII)

Treatment of 17α-octylprogesterone [Chemistry and Industry, 118 (1963)] in dioxane saturated with hydrogen chloride with dichlorodicyano-p-benzoquinone in the manner described in Example 27 gives 17α-octylpregna-4,6-diene-3,20-dione.

Example 31.—Preparation of 3β-hydroxy-17α-octylpregna-4,6-dien-20-one (XIX)

Treatment of 17α-octylpregna-4,6-diene-3,20-dione (Example 30) with sodium borohydride according to the procedure of Example 25 furnishes 3β-hydroxy-17α-octylpregna-4,6-dien-20-one.

Example 32.—Preparation of 3β-acetoxy-17α-octylpregna-4,6-dien-20-one (XV)

Treatment of 3β-hydroxy-17α-octylpregna-4,6-dien-20-one (Example 31) with acetic anhydride in pyridine in the manner of Example 19 furnishes 3β-acetoxy-17α-octylpregna-4,6-dien-20-one.

Example 33.—Preparation of 6α,7α-epoxy-17α-ethylpregn-4-ene-3,20-dione

A solution of 2 g. of 17α-ethylpregna-4,6-diene-3,20-dione, 260 ml. of methylene chloride and a solution of 6.43 g. of monoperphthalic acid in 134 ml. of ether is kept at room temperature, protected from moisture, for 72 hours. The resulting phthalic acid is removed by filtration. The filtrate then is diluted with 300 ml. of methylene chloride, washed with saturated sodium carbonate solution, saline and then with water, dried with anhydrous magnesium sulfate and evaporated to dryness. Trituration with ether followed by filtration gives 818 mg. (40%) of product, melting point 218°–222° C. Two recrystallizations from methylene chloride-ether gives white crystals, melting point 226°–230° C. $[\alpha]_D^{25}$ +49° (0.99% in CHCl₃);

$$\lambda_{max.}^{MeOH} 241 \text{ m}\mu \ (\epsilon 14,650); \lambda_{max.}^{KBr} 5.86, 5.95, 6.11\mu$$

Example 34.—Preparation of 17α-octylpregna-4,6-diene-3,20-dione

Treatment of 17α-octylprogesterone (7.7 g.) with 2,3-dichloro-5,6-dicyano-p-benzoquinone in the manner described in Example 27 is productive of crude 17α-octylpregna-4,6-diene-3,20-dione (7.74 g.) which is subjected to partition chromatography on diatomaceous earth. The system heptane:2-methoxy ethanol is used; the column is packed with 750 g. of diatomaceous earth. The first 950 ml. of effluent contains a negligible amount of material; the next 950 ml. of effluent contains the major peak which on evaporation gives 2.5 g. of product; [α]$_D^{25}$ 0° (0.40% in CHCl₃);

λ$_{max.}^{MeOH}$ 283 mμ (ϵ 19,500); λ$_{max.}^{KBr}$ 5.88, 5.98, 6.17, 6.3μ

*Example 35.—Preparation of 6α,7α-epoxy-17α-octyl-pregn-4-ene-3,20-dione*

Treatment of 17α-octylpregna - 4,6-diene - 3,20-dione (Example 34) with monoperphthalic acid in the manner of Example 33 is productive of 6α,7α-epoxy - 17α-octyl-pregn-4-ene-3,20-dione;

λ$_{max.}^{CH_3OH}$ 237 mμ

*Example 36.—Preparation of 6-chloro-17α-ethyl-pregna-4,6-diene-3,20-dione*

A solution of 30 ml. of glacial acetic acid saturated at room temperature with hydrogen chloride is added 500 mg. of 6α,7α-epoxy-17α-ethylpregn - 4-ene-3,20-dione (Example 33). After standing for four hours, the solution is poured onto 60 ml. of iced water and stirred for 15 minutes. The amorphous material is collected by filtration and recrystallized from ether-petroleum ether to give 203 mg. (39%) of product, melting point 157°–160° C. Recrystallization from methylene chloride-ether gives white crystals, melting point 166°–170° C., [α]$_D^{25}$ +28° (0.78% in CHCl₃);

λ$_{max.}^{MeOH}$ 285 mμ (ϵ 18,200); λ$_{max.}^{KBr}$ 5.89, 6.02, 6.24, 6.31μ

*Example 37.—Preparation of 6-chloro-17α-octyl-pregna-4,6-diene-3,20-dione*

Treatment of 6α,7α-epoxy-17α-octylpregn - 4-ene-3,20-dione (647 mg., Example 35) with hydrogen chloride in the manner of Example 36 gives crude 6-chloro - 17α-octylpregna-4,6-diene-3,20-dione (622 mg.) which is subjected to purification by partition chromatography on diatomaceous earth. The system heptane:2-methoxy ethanol is used; the column is packed with 400 g. of diatomaceous earth. The first 750 ml. of effluent contains a negligible amount of material; the next 1150 ml. of effluent contains the major peak which on evaporation gives 361 mg. of product; [α]$_D^{25}$ +3.6° (0.83% in CHCl₃);

λ$_{max.}^{MeOH}$ 284 mμ (ϵ 27,600); λ$_{max.}^{CHCl_3}$ 5.91, 6.02, 6.10, 6.22μ

*Example 38.—Preparation of 6-chloro-17α-ethyl-3β-hydroxypregna-4,6-dien-20-one*

To a solution of 200 mg. of 6-chloro-17α-ethylpregna-4,6-dien-3,20-dione (Example 34) in 75 ml. of methanol, 5 ml. of tetrahydrofuran and 1 ml. of water is added 200 mg. of sodium borohydride; the solution is kept at room temperature for 16 hours. The solvents are removed, and the residue is distributed between methylene chloride and a 1% sodium hydroxide solution. The organic layer is washed with saline, dried over magnesium sulfate and evaporated. The residue crystallizes from acetone-hexane to give white crystals, melting point 192°–193° C., λ$_{max.}^{MeOH}$ 235, 242, 250 mμ; λ$_{max.}^{KBr}$ 2.85, 5.92μ

*Example 39.—Preparation of 6-chloro-17α-octyl-3β-hydroxypregna-4,6-dien-20-one*

Treatment of 6-chloro-17α-octylpregna-4,6-diene-3,20-dione (Example 37) with sodium borohydride in the manner described in Example 38 produces 6-chloro-17α-octyl-3β-hydroxypregna-4,6-dien-20-one.

*Example 40.—Preparation of 3β-acetoxy-6-chloro-17α-ethylpregna-4,6-dien-20-one*

Treatment of 6-chloro-17α-ethyl - 3β-hydroxy-pregna-4,6-dien-20-one (Example 38) with acetic anhydride in pyridine as described in Example 19 is productive of 3β-acetoxy-6-chloro-17α-ethylpregna-4,6-dien-20-one.

*Example 41.—Preparation of 3β-acetoxy-6-chloro-17α-octylpregna-4,6-dien-20-one*

Treatment of 6-chloro-17α-octyl - 3β-hydroxypregna-4,6-dien-20-one (Example 39) with acetic anhydride by the procedure of Example 19 produces 3β-acetoxy-6-chloro-17α-octylpregna-4,6-dien-20-one.

*Example 42.—Preparation of 17α-ethylpregn-5-en-20-one*

To a solution of 360 mg. of 3β-chloro-17α-ethylpregn-5-en-20-one (Example 7) in 15 ml. of boiling amyl alcohol are added small pieces of sodium metal. Each addition is made after all metal has dissolved and a total of 2 g. of metal is added. The amyl alcohol is removed, and the residue is distributed between water and methylene chloride. The solvent is removed from the organic layer and the residue is dissolved in 5 ml. of pyridine. This solution is added to an ice-chilled slurry of 300 mg. of chromium trioxide in pyridine. The mixture is kept at room temperature for 16 hours and then poured into water. The product is isolated with ethyl acetate to give material which has λ$_{max.}^{KBr}$ 5.92μ and no appreciable absorption at 20γ/ml. in the ultraviolet region.

We claim.

1. The compound 17α-ethyl-3β-fluoro - 6-methylpregn-5-en-20-one.

2. A 17-lower alkyl pregn-5-en-20-one of the formula:

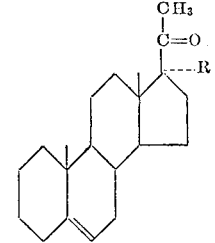

wherein R is lower alkyl.

References Cited

Bowers et al.: J.A.C.S., 84, p. 1050–53 (1962).
Djerassi et al.: J. Org. Chem. 16, p. 754–60 (1951).
Gut: J. Org. Chem. 21, p. 1327–28 (1956)
Kupfer: Tetrahedron 15, p. 193–196 (1961).
Lowenthal: Tetrahedron, vol. 6, No. 4, p. 269–303, June 1959.
Romo et al.: J.A.C.S. 73, p. 1528–33 (1951).
Weiss et al.: Chem. and Industry, p. 118–119, January 1963

LEWIS GOTTS, *Primary Examiner.*

H. FRENCH, J. R. GENTRY, *Assistant Examiners.*